US006942147B2

(12) United States Patent
Lahteenmaki et al.

(10) Patent No.: US 6,942,147 B2
(45) Date of Patent: Sep. 13, 2005

(54) SMART CARD READER

(75) Inventors: Markku Lahteenmaki, Helsinki (FI); Janne Uusilehto, Tampere (FI); Teemu Kannisto, Tampere (FI); Jani Uusi-Rantala, Pori (FI); Kari Ketola, Tampere (FI); Niall O'Donoghue, Narva (FI); Istvan Nyilas, Tampere (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/049,199

(22) PCT Filed: Feb. 8, 2001

(86) PCT No.: PCT/FI01/00119

§ 371 (c)(1),
(2), (4) Date: May 9, 2003

(87) PCT Pub. No.: WO02/063576

PCT Pub. Date: Aug. 15, 2002

(65) Prior Publication Data

US 2003/0183691 A1 Oct. 2, 2003

(51) Int. Cl.[7] .................................................. G06K 7/06
(52) U.S. Cl. ....................... 235/441; 235/375; 235/380; 235/486; 235/492
(58) Field of Search ................................. 235/492, 380, 235/375, 441, 486; 717/136, 139

(56) References Cited

U.S. PATENT DOCUMENTS 5,359,182 A * 10/1994 Schilling .................... 235/380
5,541,583 A * 7/1996 Mandelbaum ........... 340/10.51
5,613,159 A 3/1997 Colnot ....................... 395/831
6,089,460 A * 7/2000 Hazama ...................... 235/492
6,175,922 B1 * 1/2001 Wang ......................... 713/182
6,308,317 B1 * 10/2001 Wilkinson et al. .......... 717/139
6,493,550 B1 * 12/2002 Raith ...................... 455/422.1
6,549,773 B1 * 4/2003 Linden et al. ........... 455/426.1
6,612,486 B2 * 9/2003 Sato et al. .................. 235/375
6,678,863 B1 * 1/2004 Sugiyama ................... 714/799
6,680,913 B1 * 1/2004 Malmivirta et al. ........ 370/249
6,687,350 B1 * 2/2004 Landry et al. ......... 379/144.04
6,697,352 B1 * 2/2004 Ludwig et al. ............. 370/349

FOREIGN PATENT DOCUMENTS

| | | |
|---|---|---|
| EP | 0 691 625 A1 | 1/1996 |
| EP | 0 820 178 A2 | 1/1998 |
| EP | 0 889 430 A2 | 1/1999 |
| EP | 1 041 520 A2 | 10/2000 |
| WO | WO 96/25828 | 8/1996 |
| WO | WO 00/11624 | 3/2000 |

* cited by examiner

*Primary Examiner*—Ahshik Kim
(74) *Attorney, Agent, or Firm*—Harrington & Smith, LLP

(57) ABSTRACT

The subject of the invention is a smart card reader (31) comprising a card reader part for receiving a detachable smart card (11) connected to it and for communicating information between the smart card reader (31) and the smart card (11). In addition, the smart card reader (31) comprises a short-range communications part (32) connected to said card reader part for communicating information using a RF wireless method between the smart card reader (31) and a wireless communications terminal (8) external to it; said short-range communications part (32) comprising a processing unit (MCU) for controlling the short-range communications part. Said processing unit (MCU) contained in the short-range communications part (32) is arranged to control the operations of the card reader part in addition to the operations of the short-range communications part (32). In addition, the subject of the invention covers a method and a system.

16 Claims, 5 Drawing Sheets

SMART CARD READER

FIELD OF THE INVENTION

The present invention relates to a smart card reader. In addition, it relates to a system comprising said smart card reader and a wireless communications device. In addition, the invention relates to a method in said system.

BACKGROUND OF THE INVENTION

Lately, the use of smart cards has become more widespread. Two common implementations have been to use a smart card as a means of payment and to use it for identifying a person (or device). A smart card suitable for payment purposes has commonly been called a chip card or an electronic purse, and a card suitable for electronic identification purposes has been called an identification card.

Smart cards are so-called processor cards (FIG. 1) comprising a microprocessor and a memory. Typically, the microprocessor and memory are implemented by means of an integrated circuit (IC), located inside the smart card 11 below the externally visible connectors 22.

For the smart card to be used, it must be inserted into a smart card reader. In the case of an electronic purse, money can be stored on the card using a smart card reader in an ATM, for example. Payments are made for example by inserting the smart card into a smart card reader at the point of sale; the reader will deduct the payment from the balance stored on the card.

European patent application publication EP 1 041 520 A2 describes an arrangement (FIG. 2) where a smart card reader 10 is integrated in a wallet 9. The arrangement is designed to enable electronic payment of purchases made with a mobile communications terminal 8 utilizing the electronic purse 11. The electronic purse (smart card) 11 is inserted into the smart card reader 10 that is integrated in the wallet 9. There is a connection 13 from the smart card reader 10 to a Bluetooth transceiver 14 located in the wallet 9. The Bluetooth transceiver 14 communicates over a Bluetooth connection with another Bluetooth transceiver 15 located in the mobile communications terminal 8. The mobile communications terminal 8 is connected over the cellular network connection 16 to an Internet server 17 requesting payment. The payment data is sent over the cellular network connection 16 to the mobile communications terminal 8. By means of the Bluetooth transceiver 15, the mobile communications terminal 8 establishes a Bluetooth connection 12 to the Bluetooth transceiver 14 in the wallet 9. The payment data is transmitted via the connection 13 from the Bluetooth transceiver 14 to the smart card reader 10 which will deduct the balance in the electronic purse 11 by the purchase amount.

According to patent application publication EP 1 041 520 A2, the smart card reader 10 comprises a processor and memory. In addition, the smart card reader 10 comprises a serial interface to transmit data in a serial format through connection 13 between the smart card reader 10 and the Bluetooth transceiver 14. The connection 13 between the smart card reader and the Bluetooth transceiver 14 can be implemented by means of a flexible ribbon cable, for example.

The Bluetooth transceiver 14 contains an ASIC (Application Specific Integrated Circuit) which comprises a processor. In addition, the Bluetooth transceiver 14 comprises a memory and a RF part that transmits and receives data on the 2.4 GHz band.

The smart card reader and Bluetooth transceiver described in patent application publication EP 1 041 520 A2, with the processor and memory, have a relatively high total power consumption. In addition, their space requirement is quite large.

SUMMARY OF THE INVENTION

According to a first aspect of the invention there is provided a smart card reader comprising:

- a card reader part for receiving a smart card detachably connectable to it and for communicating information between the smart card reader and the smart card, and
- a short-range communications part coupled to said card reader part for communicating information using a RF wireless method between the smart card reader and a wireless communications terminal external to it, said short-range communications part comprising a processing unit for controlling the short-range communications part, wherein
- said processing unit comprised in the short-range communications part is configured to control, in addition to the operation of the short-range communications part, also the operation of the card reader part,
- the smart card reader is configured to communicate with the wireless communications terminal and the smart card by using a set of protocol layers comprising at least an application layer and a transmission layer, and wherein
- said short-range communications part is configured to receive an application layer level command from the wireless communications terminal and
- said processing unit is configured to convert the application layer level command into a transmission layer level command for a transfer to be performed to the smart card, and to transfer said converted transmission layer command via the card reader part to the smart card.

Preferably, said short-range communications part is a Bluetooth chip comprising a Bluetooth transceiver. Alternatively, the short-range communications part comprises another type of short-range RF transceiver such as a WLAN (Wireless Local Area Network) transceiver. In a preferred embodiment, the card reader part does not have its own processing unit (nor memory); instead, software controlling the operation of both the card reader part and the short-range communications part is run in a single processing unit located on the Bluetooth chip. In a preferred embodiment, the smart card reader software is stored in a single memory located on the Bluetooth chip in the smart card reader. The Bluetooth chip is an integrated circuit.

Said smart card is an electronic card preferably containing data that can be used in payment or identification applications. In a preferred embodiment, the smart card is a payment card/electronic purse containing money and/or payment units in an electronic form. Alternatively or additionally, the smart card may contain data used for the electronic identification of a person or device. It may be a combined payment and identification card.

According to a second aspect of the invention there is provided a smart card reader comprising:

- a card reader part for receiving a smart card detachably connectable to it and for communicating information between the smart card reader and the smart card, and
- a short-range communications part coupled to said card reader part for communicating information using a RF wireless method between the smart card reader and a wireless communications terminal external to it, said short-range communications part comprising a processing unit for controlling the short-range communications part, wherein said processing unit comprised in the short-range communications part is arranged to control, in addition to the operation of the short-range communications part, also the operation of the card reader part.

According to a third aspect of the invention there is provided a smart card reader comprising:

a card reader part for receiving a smart card detachably connectable to it and for communicating information between the smart card reader and the smart card, and a short-range communications part coupled to said card reader part for communicating information using a RF wireless method between the smart card reader and a wireless communications terminal external to it, said short-range communications part comprising:

a RF integrated circuit for transmitting and receiving a RF signal, and a baseband integrated circuit coupled to the RF integrated circuit for processing baseband signals, said baseband integrated circuit comprising a processing unit arranged to control the operations of the RF integrated circuit in addition to processing baseband signals, thus essentially controlling the operation of the whole short-range communications part, wherein said processing unit comprised in the baseband integrated circuit is arranged to control, in addition to the operation of the short-range communications part, also the operation of the card reader part.

According to a fourth aspect of the invention there is provided a system comprising a wireless communications terminal and a smart card reader, said wireless communications terminal comprising a short-range transceiver and said smart card reader comprising:

a card reader part for receiving a smart card detachably connectable to it and for communicating information between the smart card reader and the smart card, and a short-range communications part coupled to said card reader part for communicating information using a RF wireless method between the smart card reader and a short-range transceiver of the wireless communications terminal, said short-range communications part of the smart card reader comprising a processing unit for controlling the short-range communications part, wherein said processing unit comprised in the short-range communications part of the smart card reader is arranged to control, in addition to the operation of the short-range communications part, also the operation of the card reader part of the smart card reader.

A wireless communications terminal means any type of electronic device suitable for short-range wireless communications. Preferably, it is a cellular network mobile terminal comprising a short-range RF transceiver. Alternatively, the wireless communications terminal can be, inter alia, a PC computer, portable computer, or multimedia terminal comprising short-range RF functions.

According to a fifth aspect of the invention there is provided a method for communicating information in a system comprising a wireless communications terminal and a smart card reader located externally to it, connected via a short-range wireless RF connection, said smart card reader being adapted to receive a smart card detachably connectable to it, said method comprising:

the wireless communications terminal, smart card reader, and smart card implementing a set of protocol layers comprising at least an application layer and a transmission layer;

communicating between the wireless communications terminal, the smart card reader, and the smart card according to said protocol layers in such a way that the method comprises:

generating an application layer level command in the wireless communications terminal;

transmitting the application layer level command from the wireless communications terminal to the smart card reader over a short-range wireless connection, receiving the application layer level command at the smart card reader, converting, in the smart card reader, the application layer level command into a transmission layer level command for a transfer to be performed to the smart card, transferring said converted transmission layer level command from the smart card reader to the smart card.

The smart card reader according to the invention can be implemented in fairly small size. It can be a self-contained unit or it can be integrated in another device such as a wallet.

BRIEF DESCRIPTION OF THE DRAWINGS

In the following, the invention will be discussed in more detail by referring to the enclosed drawings, in which.

DETAILED DESCRIPTION

Figure 1:
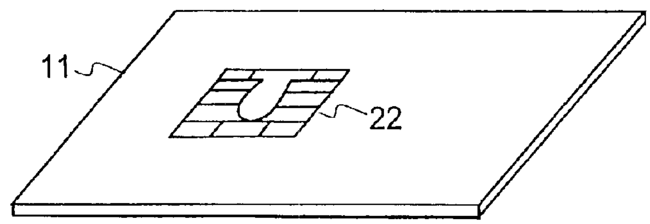
FIG. 1 shows a prior art smart card.
Figure 2:
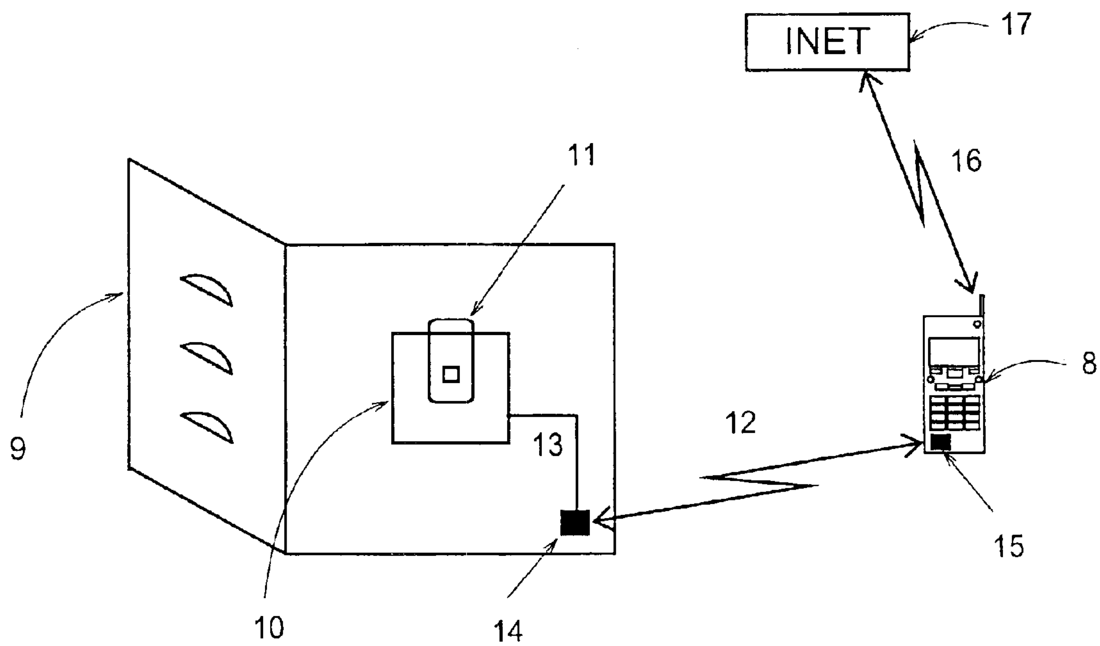
FIG. 2 shows a prior art arrangement for transferring electronic money.
Figure 3:
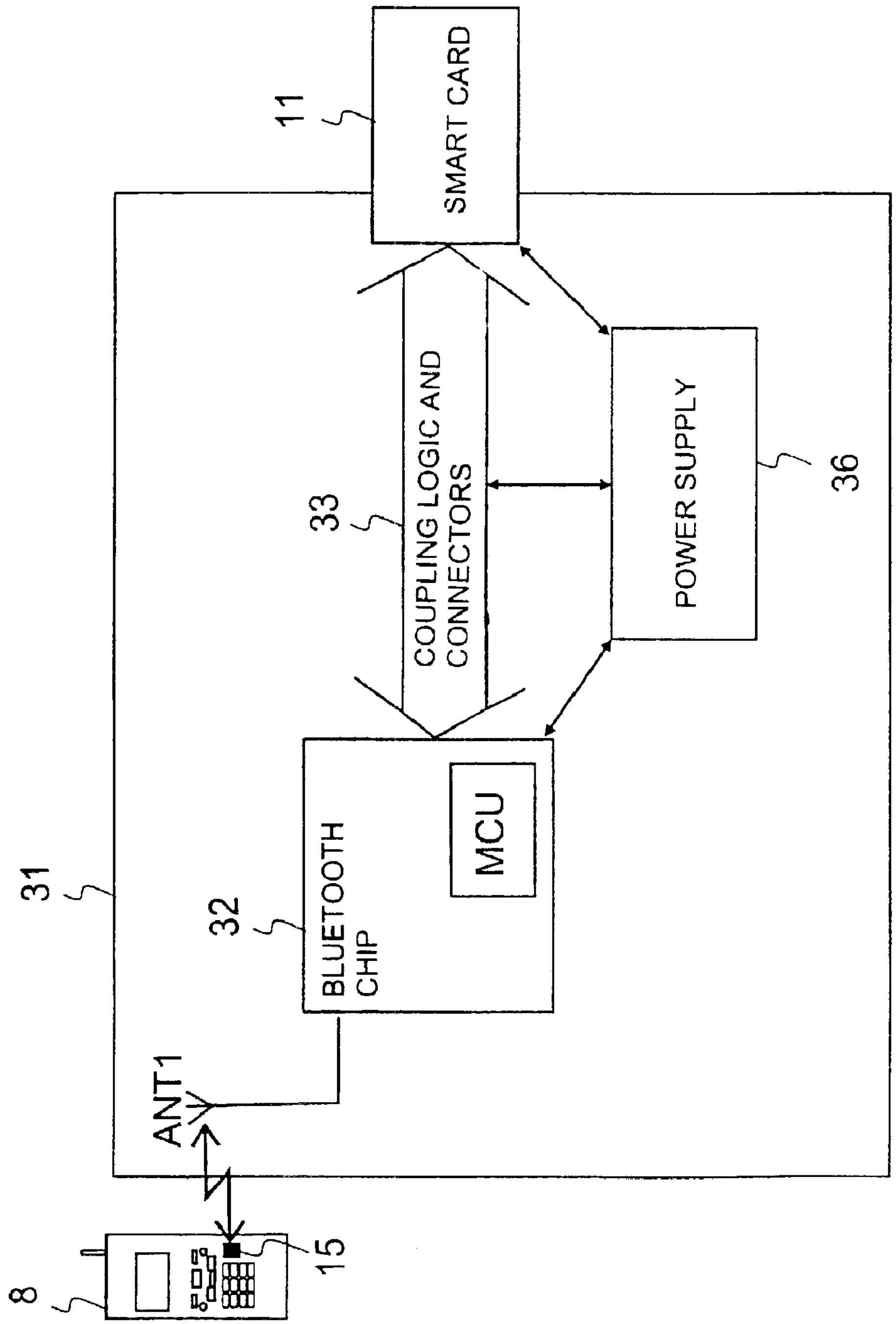
FIG. 3 shows a hardware setup according to a preferred embodiment of the invention.

FIGS. 1 and 2 have already been described above, in the description of prior art. FIG. 3 shows a hardware setup/system according to a preferred embodiment of the invention. The hardware setup comprises a smart card reader 31 and an external wireless communications terminal 8. The smart card reader 31 comprises a short-range communications part for transmitting information between the smart card reader and the wireless communications terminal 8, and the actual card reader part. The card reader part is used, among other things, to transfer information between the smart card reader 31 and a detachable smart card 11 connected to it. In some cases, it may be difficult to make a concrete distinction between the short-range communications part and the card reader part of the smart card reader. They can be overlapping, and they can have common parts. Thus, in the general case, they mainly represent two different functionalities of the smart card reader. The smart card reader 31 comprises a Bluetooth chip 32. The short-range communications part comprises a Bluetooth transceiver implemented in said Bluetooth chip 32. In practice, in this embodiment, the Bluetooth chip 32 and the short-range communications part refer to the same object. The wireless communications terminal 8 also comprises a Bluetooth transceiver 15. The Bluetooth transceivers 8 and 15 are able to send wireless signals to each other using the method specified by the Bluetooth protocol.

A section of the card reader part, that is, the software functionality of the card reader part, is implemented in the Bluetooth chip 32. In other words, an application for controlling the operations of the card reader part is stored in the Bluetooth chip 32, and the application is executed in the processing unit MCU of the Bluetooth chip together with the application controlling the short-range communications part. Said applications can be separate applications or one single application.

In addition to said software functionality, the card reader part of the smart card reader comprises a card slot where a detachable smart card 11 of the processor card type can be inserted, as well as the coupling logic and connectors 33. The smart card reader 31 also comprises a power supply block 36 whose task is to supply power both to the short-range communications part and the card reader part. The power supply block is also used to supply power to the smart card 11 connected to the card reader part.

The smart card 11 is connected to the smart card reader 31 by means of connectors. The connectors are mechanical connectors which contact the corresponding connectors in the smart card reader 11 when the smart card is inserted in the card slot. Through the connectors and the coupling logic 33, the smart card 11 is connected to the Bluetooth chip 32. Electrical signals can be transmitted between the Bluetooth chip 32 and the smart card 11. An I/O bus is arranged between the Bluetooth chip 32 and the smart card 11 to communicate the electrical signals between the Bluetooth chip and the smart card.

The power supply block 36 is responsible for supplying power to the smart card reader 31. It comprises a power source that can be, for example, a 3 V battery or an adjustable power source. The power supply block 36 feeds the supply voltage to the Bluetooth chip 32, the coupling logic, and through the connectors to the smart card 11. Depending on the operating voltage of the smart card 11, the coupling logic will carry out the required voltage conversions to supply the smart card 11 with the correct voltage. The voltage conversions are commanded by the processing unit MCU in the Bluetooth chip 32. The operating voltage of current smart cards is either 3 V or 5 V.

In addition, the coupling logic can carry out buffering of signals between the Bluetooth chip 32 and the smart card 11. Buffering means, for example, the suppression of harmful voltage surges from the Bluetooth chip to the smart card. The coupling logic may comprise a clock (not shown), from where the required oscillation frequency can be conveyed to the smart card 11. The coupling logic can be implemented by means of components and/or an integrated circuit suitable for the purpose.

In the Bluetooth chip 32, a microprocessor MCU, microcontroller, digital signal processor or a similar processing unit is implemented; this unit controls the overall operation of the smart card reader 31 (both the short-range communications part and the card reader part).

The smart card reader 31 can be implemented on a printed circuit board by placing the necessary components on the board. The smart card reader 31 can be enclosed for example in a plastic enclosure. The enclosed smart card reader forms its own unit, communicating with the environment (with the wireless communications terminal 8) over a Bluetooth connection. Alternatively, the smart card reader 31 can be located in a wallet or another suitable device. The Bluetooth connection is a point-to-point connection with a maximum range of approximately 10 meters using normal transmitter power. By increasing transmitter power, ranges of up to 300 meters can be reached using Bluetooth technology.

Figure 4:
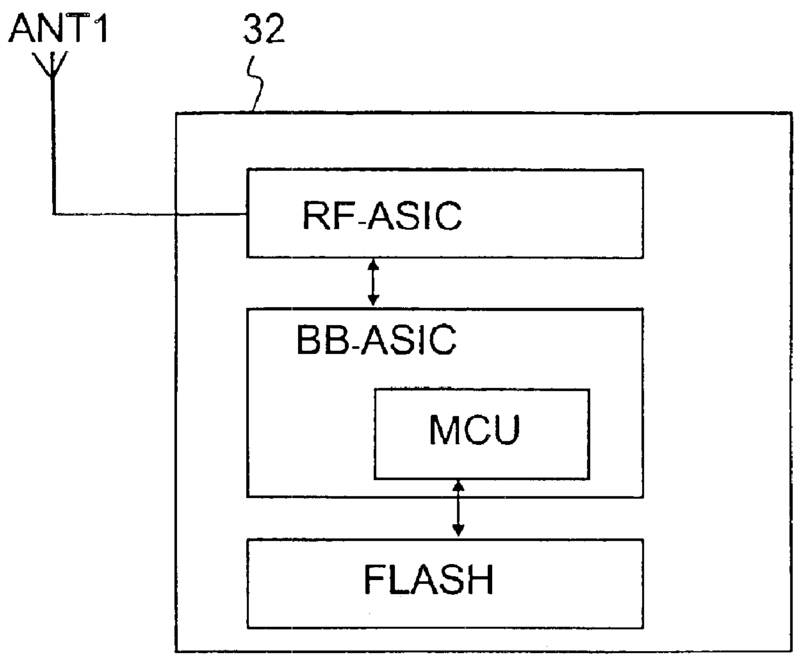
FIG. 4 is a block diagram of a detailed part of the hardware setup shown in FIG. 3.

FIG. 4 is a block diagram illustrating details of the as such well known Bluetooth chip 32 in the smart card reader 31. The Bluetooth chip 32, which can also be called a Bluetooth module, is a programmable device, an integrated circuit unit cased in a metal enclosure to prevent electromagnetical interference; actually, it typically comprises more than one integrated circuit. The Bluetooth chip 32 comprises an RF-ASIC circuit (Radio Frequency—Application Specific Integrated Circuit) and an antenna ANT1, a BB-ASIC circuit (BaseBand—Application Specific Integrated Circuit) and an electrically erasable FLASH memory. The ASIC circuits and FLASH memory are placed on a printed circuit board and cased in a metal enclosure, such as a sheet metal enclosure, to form the Bluetooth chip 32. Alternatively or additionally, the Bluetooth chip 32 may comprise an EEPROM memory (Electrically Erasable Programmable Read-Only Memory), which is another type of electrically erasable memory. The Bluetooth chip 32 comprises at least one I/O port for connecting the serial I/O bus going to the smart card 11. A person skilled in the art will appreciate that in addition to said components, the Bluetooth chip 32 can contain other components.

The BB-ASIC is a baseband integrated circuit that carries out the processing of baseband signals. Said processing unit MCU of the Bluetooth chip 32 is implemented in the BB-ASIC. The BB-ASIC is connected to the RF-ASIC. The RF-ASIC is a radio frequency integrated circuit. Using its antenna ANT, the RF-ASIC implements a Bluetooth transceiver operating in the 2.4 GHz band. The processing unit MCU in the BB-ASIC controls the operations of the RF-ASIC.

The MCU controls the transfer of information from the Bluetooth chip 32 to the smart card 11 and from the smart card 11 to the Bluetooth chip 32. The MCU is also responsible for controlling the smart card power supply by commanding the voltage conversions carried out by the coupling logic and/or the power supply block.

The FLASH memory is connected to the processing unit MCU. The FLASH memory stores the operating system and the program code for the Bluetooth application (containing, for example, the Bluetooth protocols) controlling the short-range communications part (Bluetooth transceiver) as well as the program code for the card reader application controlling the card reader part (including, for example, the protocols used in communicating with the smart card). Said applications form the software of the smart card reader 31. The MCU executes said applications on the operating system, utilizing the FLASH memory. The software can be programmed using a programming language appropriate for the purpose; for example, the C++ programming language. The software can be implemented so that the Bluetooth application and the card reader application are separate programs, both of which are executed in the microprocessor MCU contained in the short-range communications part (Bluetooth chip). Alternatively, the Bluetooth application and the card reader application can be parts of a single computer program as stated above.

The smart card 11 comprises a processing unit, memory, and an application. Said application is pre-stored into the memory of the smart card. The processing unit executes said application, utilizing the memory. For the I/O bus coming from the Bluetooth chip 32, the smart card comprises at least one I/O pin. The I/O pin is connected to the processing unit.

Figure 5:
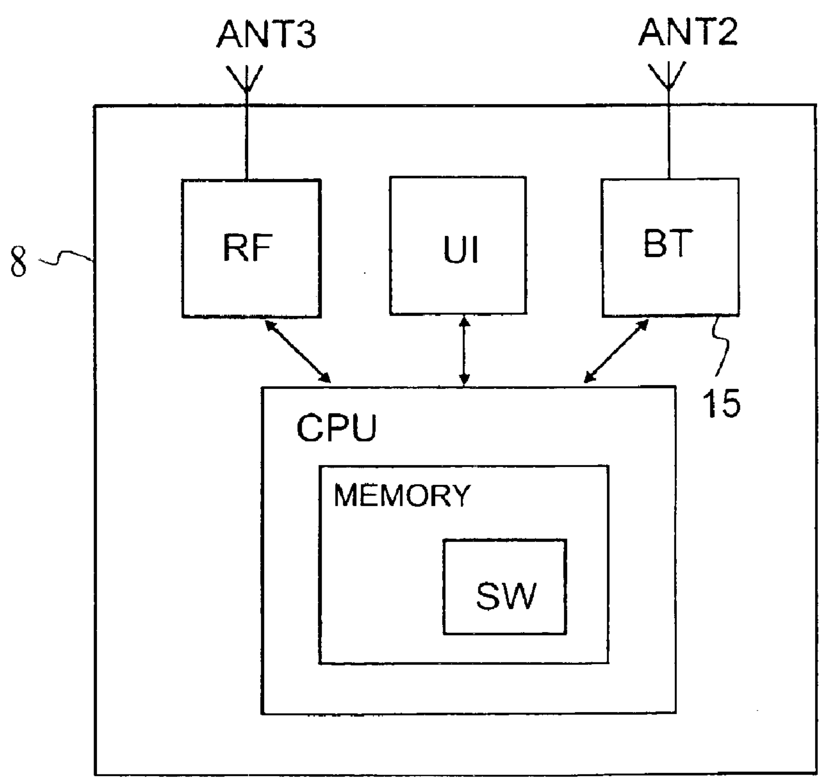
FIG. 5 shows a wireless communications terminal that can be used to implement the invention.

FIG. 5 shows a wireless communications terminal suitable for implementing the invention, namely, a cellular mobile communications terminal. The mobile communications terminal 8 comprises a processing unit CPU, a user interface UI, a radio frequency section RF and a short-range transceiver 15. The user interface UI, the radio section RF and the short-range transceiver 15 are connected to the processing unit CPU. The processing unit CPU comprises a microprocessor, microcontroller, digital signal processor or similar processing device, a memory MEM and software (one or more applications) SW. The software SW is stored into the memory MEM.

In the example case in FIG. 5, the short-range transceiver 15 is a Bluetooth transceiver. The user interface UI provides the user with means for operating the mobile communications terminal. It can comprise, for example, a display, a keyboard, a microphone and a speaker. The radio section RF is used to implement the cellular network functions of the mobile communications terminal. Based on the software SW, the processing unit CPU controls the operations of the mobile communications terminal, such as the use of the radio section RF and the Bluetooth transceiver 15, the presentation of information in user interface UI, and the processing of input received from the user interface UI. The Bluetooth transceiver 15 comprises an antenna ANT2 used for transmitting messages to the smart card reader 31 and receiving messages from the smart card reader 31. The antenna ANT3 in the radio section RF is used for passing information/messages between the mobile communications terminal 8 and the cellular network (not shown).

Figure 6:
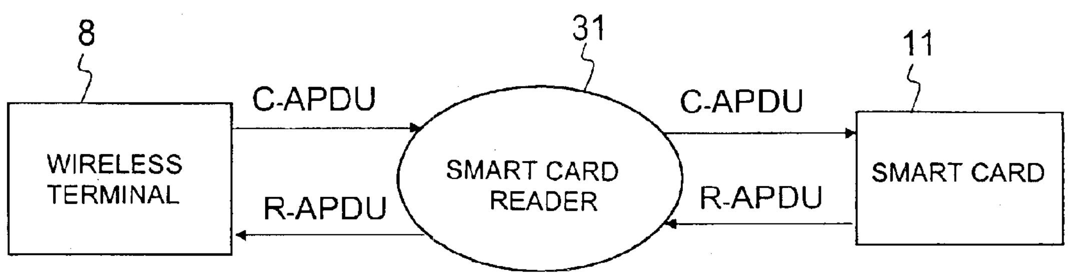
FIG. 6 shows a method of data transmission for communicating information between the wireless communications terminal, the smart card reader and the smart card, according to an embodiment of the invention.

Next, the basic operations of the above decribed hardware setup are shown (FIG. 6). For a software implementation of a preferred embodiment of the invention, a first application has been pre-stored in the memory of the wireless communications terminal 8, a second application has been pre-stored in the memory of the smart card reader 31 (here, the second application means a combination of said Bluetooth application and card reader application), and a third application has been pre-stored in the memory of the smart card 11. Said applications intercommunicate using Application Protocol Data Units (APDU) as defined in the ISO 7816 standard. The first application in the wireless communications terminal 8 can send commands to the smart card reader 31, and the second application in the smart card reader will respond to them. If the command sent by the wireless communications terminal 8 to the smart card reader 31 calls for communication with the smart card 11, the smart card reader 31 will pass the command to the smart card 11 inserted into the smart card reader 31. The second application in the smart card reader 31 may need to modify the command received from the first application in the wireless communications terminal 8 into a suitable format for transfer to the smart card 11.

Let us assume that the smart card reader has received a command from the wireless communications terminal 8 and passed it to the smart card 11. After receiving the command from the smart card reader 31, the third application on the smart card 11 will reply to the command. The third application sends its response to the smart card reader 31. After receiving a response from the smart card 11, the second application in the smart card reader 31 will pass the response to the first application in the wireless communications terminal 8. The second application in the smart card reader 31 may need to modify the response received from the smart card 11 into a suitable format for transfer to the wireless communications terminal 8.

Each APDU contains one command or one response. In the example case in FIG. 6, the command sent by the wireless communications terminal 8 to the smart card reader 31 and passed by the latter to the smart card 11 is called a command APDU (C-APDU). The response sent by the smart card 11 to the smart card reader 31 and passed by the latter to the wireless communications terminal 8 is called a response APDU (R-APDU).

The communications between the wireless communications terminal 8, the smart card reader 31 and the smart card 11 inserted to the latter is carried out using the as such well known master-slave principle. In the communications between the wireless communications terminal 8 and the smart card reader 31, the wireless communications terminal 8 is the master and the smart card reader 31 is the slave, whereas in the communications between the smart card reader 31 and the smart card 11, the smart card reader is the master and the smart card is the slave. The communications between master and slave are carried out in such a way that the master sends commands to the slave and the slave responds to them. The slave may not initiate unprompted communications with the master.

In the following, a more detailed description will be given how the commands are passed from the wireless communications terminal to the smart card reader and further to the smart card, and how the command response is transferred from the smart card through the smart card reader to the wireless communications terminal in an embodiment of the invention. In the following, it is assumed that the smart card is an electronic purse, where said command can be, for example, one of the following: "give the card balance", "deduct the card balance", "add to the card balance". (Alternatively, the smart card can be an electronic identification card, where the command can be, for example, "give the user's signature certificate" or "give the authentication certificate".)

First, the electronic purse card 11 is inserted into the smart card reader 31. Initiated by the wireless communications terminal 8, a Bluetooth connection is established between the Bluetooth transceivers in the wireless communications terminal 15 and the smart card reader 31 using the as such well known method. The processing unit CPU in the wireless communications terminal will generate an APDU containing a command. In other words, the processing unit CPU will generate a command APDU (C-APDU) in software. The processing unit in the wireless communications terminal will direct the C-APDU to the Bluetooth transceiver 15, which will send it to the smart card reader 31 using the antenna ANT2. The C-APDU will be transmitted in whole from the wireless communications terminal 8 to the smart card reader over the Bluetooth connection. The Bluetooth connection is physically implemented as a radio link in the 2.4 GHz frequency band.

Figure 7:
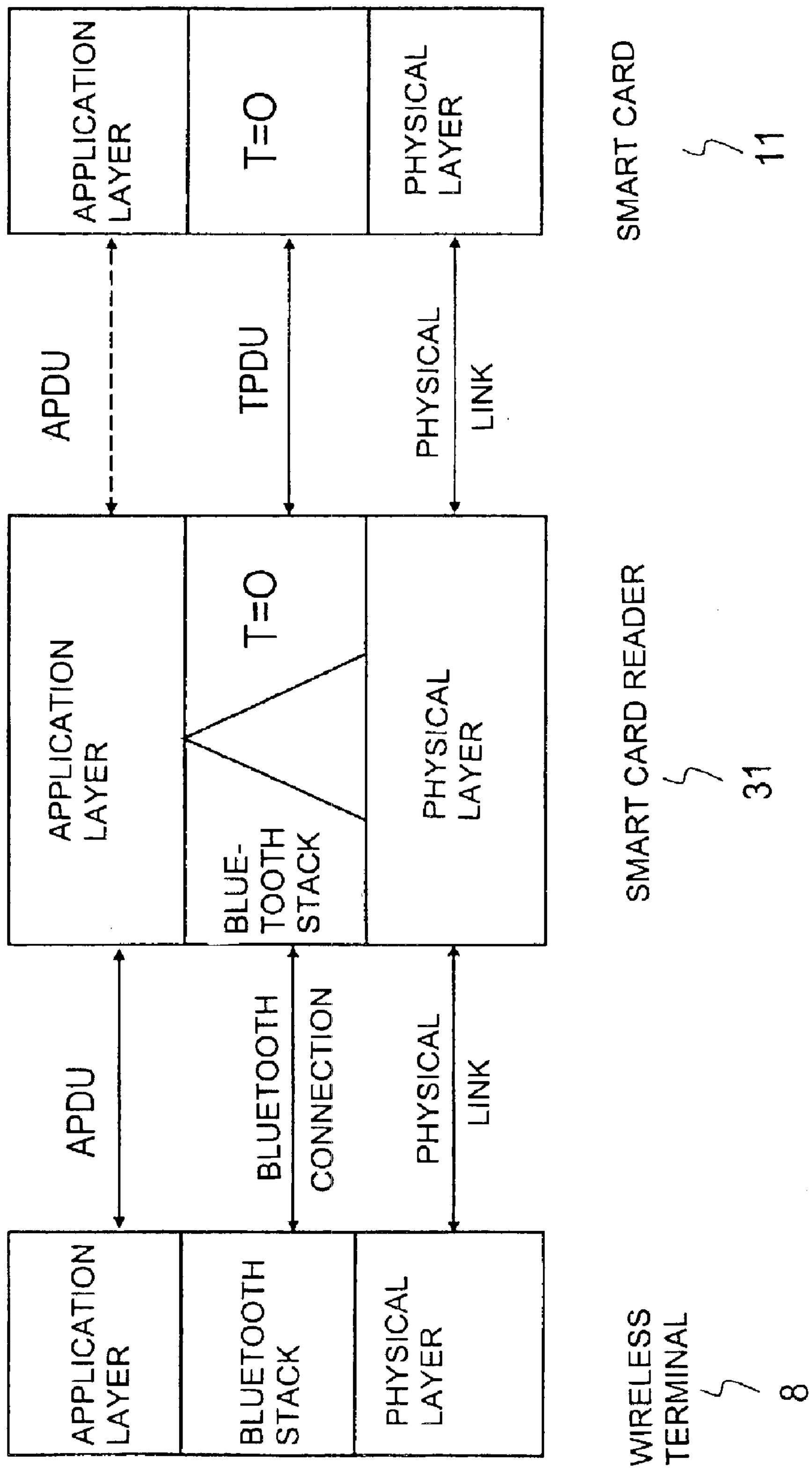
FIG. 7 is a more detailed illustration of the data transmission method shown in FIG. 6.

The communications between the wireless communications terminal 8, the smart card reader 31 and the smart card (electronic purse) 11 is illustrated from a protocol-based point of view in FIG. 7, which shows some of the protocol layers in the wireless communications terminal 8, the smart card reader 31, and the smart card 11. A person skilled in the art will appreciate that in addition to the protocol layers shown in FIG. 7, the various devices can also contain other layers. All devices have a physical layer as the lowest layer. The physical link between the wireless communications terminal 8 and the smart card reader 31 is implemented by means of a radio link, which in the case of Bluetooth technology operates in the 2.4 GHz band. The physical link between the smart card reader 31 and the smart card 11 will be mechanically implemented by means of an I/O bus, for example. In the wireless communications terminal 8 and the smart card reader 31, the Bluetooth protocol stack serves as the transmission layer above the physical layer. At the transmission layer level, the wireless communications terminal 8 and the smart card reader 31 communicate using a Bluetooth connection. The application layer is placed above of the Bluetooth protocol stack. In this embodiment, the wireless communications terminal 8 (for example, said first application) and the smart card reader 31 (said second application) communicate on the application layer level using APDUs as stated above. In the smart card 11, there is a transmission layer protocol above the physical layer; in the example case in FIG. 7, this is the transmission protocol T=0. Correspondingly, in the smart card reader 31, the transmission protocol T=0 is located above the physical layer in the direction of the smart card. The transmission protocols intercommunicate using Transmission Protocol Data Units (TPDU) on the transmission layer. The transmission protocol T=0 is defined in the ISO 7816 standard. In the smart card reader 31 and the smart card 11, there is an application layer above the transmission protocol. At the application layer level, the smart card reader 31 (for example, said second application) and the smart card 11 (said third application) communicate using APDUs. The transmission protocol below the application layer will dictate the transmission method of APDUs between the smart card reader 31 and the smart card 11.

Let us return to the functional description. In the previous section, the C-APDU was sent over the Bluetooth connection from the wireless communications terminal 8 to the smart card reader 31. The smart card reader 31 will receive the C-APDU using the antenna ANT1 in its Bluetooth transceiver; the C-APDU will then be passed through the Bluetooth transceiver to the processing unit MCU. Based on said second application, the processing unit MCU will split the C-APDU to TPDUs defined by the transmission protocol T=0 for the C-APDU to be transferred to the electronic purse card 11. This way, the processing unit MCU will carry out a certain type of protocol conversion, where the application layer APDU is converted into a transmission layer TPDU. Each TPDU will typically contain one byte of the C-APDU (in case of the transmission protocol T=0). The processing unit MCU will send the TPDUs generated from the C-APDU to the electronic purse card 11 through an I/O bus arranged between the smart card reader 31 and the electronic purse card. This way, the C-APDU will be sent from the smart card reader 31 to the electronic purse card 11 in parts (because in this embodiment, the C-APDU will be transferred from the smart card reader 31 to the electronic purse card 11 in parts defined by the transmission protocol T=0, and thus not in whole, the connection between the application layers is shown with a dashed line in FIG. 7). Said third application in the electronic purse card 11 will receive the TPDUs, compile the received TPDUs into a C-APDU, and execute the command contained in the C-APDU.

After executing the command contained in the C-APDU, the third application in the electronic purse card 11 will send a response to the smart card 31. If said command was "give the card balance", an APDU will be sent to the smart card reader indicating the balance of the electronic purse card. Said APDU is called a response APDU (R-APDU). If the command was "deduct the card balance", a R-APDU will be sent to the smart card reader 31 indicating that the deduction succeeded (given that the deduction of balance was actually successful). If the command was "add to the card balance", a R-APDU will be sent to the smart card reader 31 indicating that the addition succeeded (given that the addition of balance was actually successful).

Thus, in each case, the third application in the smart card will generate a R-APDU containing a response to the command. Based on said third application, the processing unit of the electronic purse card will split the R-APDU to TPDUs defined by the transmission protocol T=0 for transfer to the smart card reader 31. The processing unit in the electronic purse card will send the TPDUs over the I/O bus to the smart card reader 31. Based on said second application, the processing unit MCU in the smart card reader 31 will compile the received TPDUs into RAPDUs. The processing unit MCU will direct the R-APDU to the Bluetooth transceiver, which will send the R-APDU to the wireless communications terminal 8 through its antenna ANT2. The R-APDU will be transmitted in whole from the smart card reader 31 to the wireless communications terminal 8 over the Bluetooth connection. The wireless communications terminal 8 will receive the R-APDU using the antenna ANT2 in its Bluetooth transceiver, which will pass the R-APDU through the Bluetooth transceiver 15 to the first application in the control unit CPU. The R-APDU tells the first application the response to the command sent in the CAPDU.

In the previous section, operations according to a preferred embodiment of the invention were described; here, the wireless communications terminal 8 generated a C-APDU sent to the smart card 11. The C-APDU was sent to the smart card reader 31 which split the C-APDU into TPDUs defined by the transmission protocol T=0 and sent the TPDUs to the smart card 11. The C-APDU was transferred from the smart card reader 31 to the smart card 11 in parts, because the transmission protocol T=0 does not support the transfer of the C-APDU in one part.

In the communications between the smart card reader 31 and the smart card 11, it is possible to use another transmission protocol in place of the transmission protocol T=0. In an alternative embodiment of the invention, the transmission protocol T=0 is replaced with the transmission protocol T=1. Also the protocol T=1 is defined in the ISO 7816 standard. The protocol T=1 is a block-oriented transmission protocol. It enables the transmission of the whole C-APDU in one part. In this embodiment, said second application in the smart card reader 31 will convert the C-APDU received from the wireless communications terminal 8 into a TPDU according to transmission protocol T=1 and send the TPDU to the smart card 11 over the I/O bus. In this embodiment, the C-APDU is thus transmitted in one part between the smart card reader 31 and the smart card 11 inside the TPDU (in the previous section, when using the transmission protocol T=0, the C-APDU was transmitted in parts). The smart card reader 31 will negotiate the transmission layer protocol to be used with the smart card 11 in advance.

In both of the embodiments described above, the wireless communications terminal generates a command at the application layer level (C-APDU) which will then be delivered to the smart card. The C-APDU is transmitted to the smart card in TPDUs (or a TPDU) at the transmission layer level. Because in these embodiments, the conversion between C-APDU and TPDU is done only in the smart card reader and not in the wireless communications terminal 8, for example, it is possible to spare the processing resources of the wireless communications terminal. In these embodiments, the wireless communications terminal is not even required to know the transmission layer protocol (for example, T=0, T=1) used in the communications between the smart card reader 31 and the smart card 11, and nevertheless, the setup will work in the appropriate way.

Because the application layer communications between the wireless communications terminal 8, the smart card reader 31 and the smart card 11 is carried out using APDUs defined in the ISO 7816 standard, and because a large number of different smart cards supports application layer communications using APDUs, the smart card reader can be made fairly general-purpose. It can be used with many different types of smart cards.

In an alternative embodiment of the invention, the C-APDU/TPDU protocol level conversion is carried out already in the wireless communications terminal 8. Here, the TPDUs (or TPDU) are sent over the Bluetooth connection to the smart card reader 31 which will pass them (or it) further to the smart card 11. In this embodiment, it is possible to spare processing resources in the smart card reader 31 at the cost of additional processing work in the wireless communications terminal 8.

In another alternative embodiment of the invention, the wireless communications terminal 8 is still the master and the smart card reader 31 is the slave, but in this embodiment, the generation of C-APDUs is only carried out in the smart card reader 31. The wireless communications terminal 8 will send the smart card reader 31 a higher (protocol) level command (a command above the APDU level) over the Bluetooth connection; based on this command, the smart card reader 31 will generate the appropriate C-APDU and send it to the smart card 11 by means of an appropriate transmission protocol. The smart card will respond to the C-APDU with an R-APDU and send the R-APDU to the smart card reader using the transmission protocol; the smart card reader will then generate a response to said higher level command based on the R-APDU. After this, the smart card reader will send a response to the wireless communications terminal 8 over the Bluetooth connection.

The benefits of the invention can be demonstrated by comparing the invention with a prior art solution. Contrary to a prior art solution where both the card reader and the Bluetooth chip contain their own processor and memory, the invention will be implemented in such a way that both the card reader software, stored in a separate memory in prior art and executed in a separate processor, and the Bluetooth software (comprising the Bluetooth protocols) will be stored in the FLASH memory of the Bluetooth chip and executed in the processing unit MCU of the Bluetooth chip. A solution according to the invention, where the software functionality of the smart card reader is integrated in the same Bluetooth chip with the Bluetooth transceiver, fits in a smaller space and consumes less power than a prior art combination of a smart card reader and a Bluetooth transceiver. Additionally, the structure of a solution according to the invention is simpler than the structure of a prior art solution.

This description presents the implementation and embodiments of the present invention with the help of examples. It is obvious to a person skilled in the art that the present invention is not restricted to details of the embodiments presented above, and that the invention can also be implemented in another form without deviating from the characteristics of the invention. For example, the applications related to the implementation of the invention can be coded/implemented in several different ways without deviating from the characteristics of the invention.

The embodiments presented should thus be considered illustrative, but not restricting. Thus, the possibilities of implementing and using the invention are only restricted by the enclosed claims. The various options of implementing the invention as determined by the claims, including the equivalent implementations, also belong to the scope of the invention.

What is claimed is:

1. A smart card reader comprising:

a card reader part for receiving a smart card detachably connectable to the card reader part and for communicating information between the smart card reader and the smart card, and a short-range communications part coupled to said card reader part for communicating information using a RF wireless method between the smart card reader and a wireless communications terminal external to the smart card reader, said short-range communications part comprising a processing unit for controlling the short-range communications part, wherein (i) said processing unit comprised in the short-range communications part is configured to control, in addition to the operation of the short-range communications part, also the operation of the card reader part, (ii) the smart card reader is configured to communicate with the wireless communications terminal and the smart card by using a set of protocol layers comprising at least an application layer and a transmission layer, and wherein (iii) said short-range communications part is configured to receive an application layer level command from the wireless communications terminal and (iv) said processing unit is configured to convert the application layer level command into a transmission layer level command for a transfer to be performed to the smart card, and to transfer said converted transmission layer command via the card reader part to the smart card.

2. A smart card reader according to claim 1, wherein the processing unit is arranged to convert the application layer level command into the transmission layer level command and transmit the command to the smart card in whole.

3. A smart card reader according to claim 1, wherein the processing unit is arranged to convert the application layer level command into the transmission layer level command and transmit the command to the smart card in parts.

4. A smart card reader according to claim 1, wherein the smart card reader is fitted to receive an APDU (Application Protocol Data Unit) from the wireless communications terminal over a short-range RF connection and to transmit the APDU to the smart card in one or more TPDUs (Transmission Protocol Data Unit).

5. A smart card reader according to claim 1, wherein the smart card reader is adapted to receive a higher application level command from the wireless communications terminal, to generate an Application Protocol Data Unit based on the command, and to transmit the Application Level Data Unit to the smart card with the aid of a transmission protocol in transmission protocol data unit(s).

6. A smart card reader according to claim 1, wherein the short-range communications part is implemented by means of a Bluetooth module and where the short-range communications part is arranged to control the operations of the card reader part by executing card reader software stored in the Bluetooth module.

7. A smart card reader according to claim 1, wherein the processing unit comprised by the short-range communications part comprises one of the following: microprocessor, microcontroller, digital signal processor.

8. A smart card reader (31) according to claim 1, wherein said short-range communications part comprises one of the following: Bluetooth transceiver, WLAN transceiver (Wireless Local Area Network).

9. A smart card reader (31) according to claim 1, wherein said smart card is one of the following: electronic purse card, electronic payment card, electronic identification card.

10. A system comprising a wireless communications terminal and a smart card reader, said wireless communications terminal comprising a short-range transceiver and said smart card reader comprising:

a card reader part for receiving a smart card detachably connectable to the card reader part and for communicating information between the smart card reader and the smart card, and a short-range communications part coupled to said card reader part for communicating information using a RF wireless method between the smart card reader and a short-range transceiver of the wireless communications terminal, said short-range communications part of the smart card reader comprising a processing unit for controlling the short-range communications part, wherein (i) said processing unit comprised in the short-range communications part of the smart card reader is arranged to control, in addition to the operation of the short-range communications part, also the operation of the card reader part of the smart card reader, (ii) the smart card reader is configured to communicate with the wireless communications terminal and the smart card by using a set of protocol layers comprising at least an application layer and a transmission layer, and wherein (iii) said short-range communications part is configured to receive an application layer level command from the wireless communications terminal and (iv) said processing unit is configured to convert the application layer level command into a transmission layer level command for a transfer to be performed to the smart card, and to transfer said converted transmission layer command via the card reader part to the smart card.

11. A method for communicating information in a system comprising a wireless communications terminal and a smart card reader located externally to the communications terminal, connected via a short-range wireless RF connection, said smart card reader being adapted to receive a smart card detachably connectable to it, said method comprising:

the wireless communications terminal, smart card reader, and smart card implementing a set of protocol layers comprising at least an application layer and a transmission layer;

communicating between the wireless communications terminal, the smart card reader, and the smart card according to said protocol layers in such a way that the method comprises:

generating an application layer level command in the wireless communications terminal;

transmitting the application layer level command from the wireless communications terminal to the smart card reader over a short-range wireless connection, receiving the application layer level command at the smart card reader, converting, in the smart card reader, the application layer level command into a transmission layer level command for a transfer to be performed to the smart card, transferring said converted transmission layer level command from the smart card reader to the smart card.

12. A method according to claim 11, the method further comprising:

receiving the transmission layer level command at the smart card, converting the transmission layer level command into an application layer level command in the smart card; and executing said command.

13. Computer-readable memory for storing computer program instructions, the computer-readable memory for use in a smart card reader comprising a card reader part for receiving a smart card detachably connectable to the card reader part and for communicating information between the smart card reader and the smart card, and a short-range communications part coupled to said card reader part for communicating information using a RF wireless method between the smart card reader and a wireless communications terminal external to the smart card reader, the short-range communications part comprising a Processing unit for controlling the short-range communications part, where the smart card reader is configured to communicate with the wireless communication terminal and the smart card by using a set of protocol layers comprising at least an application layer and a transmission layer, and wherein the computer program instructions perform at least the following operations when executed:

receiving an application layer level command from the wireless communication terminal at the smart card reader, converting, in the smart card reader, the application layer level command into a transmission layer level command for a transfer to be performed to the smart card, and transferring the transmission layer level command which had been converted from the application layer level command from the smart card reader to the smart card.

14. Computer-readable memory for storing computer programs, the computer-readable memory being distributed among elements of a system comprising a wireless communications terminal communicating with a smart card reader located externally to the communications terminal via a short-range wireless RF connection, the system further comprising a smart card being detachably connectable to the smart card reader; the wireless communications terminal, smart card reader and smart card communicating according to protocol layers, where the protocol layers comprise at least an application layer and a transmission layer, and where the computer programs perform at least the following operations when executed:

generating an application layer level command in the wireless communications terminal;

transmitting the application layer level command from the wireless communications terminal to the smart card reader aver a short-range wireless connection, receiving the application layer level command at the smart card reader, converting, in the smart card reader, the application layer level command into a transmission layer level command for a transfer to be performed to the smart card, and transferring the transmission layer level command which had been converted from the application layer level command from the smart card reader to the smart card.

15. The computer-readable memory of claim 14 where the computer programs perform at least the following additional operations:

receiving a higher application level command from the wireless communications terminal in the smart card reader;

generating in the smart card reader an Application Protocol Data Unit based on the command; and transmitting the Application Protocol Data Unit to the smart card with the aid of a transmission protocol in transmission protocol data unit(s).

16. The computer-readable memory of claim 14 where the computer programs perform at least the following additional operations:

receiving the transmission layer level command at the smart card, converting the transmission layer level command into an application layer level command in the smart card; and executing said command.

* * * * *

UNITED STATES PATENT AND TRADEMARK OFFICE

CERTIFICATE OF CORRECTION

PATENT NO. : 6,942,147 B2
DATED : September 13, 2005
INVENTOR(S) : Lahteenmaki et al.

It is certified that error appears in the above-identified patent and that said Letters Patent is hereby corrected as shown below:

Column 14,
Line 58, delete “aver” and replace with -- over --.

Signed and Sealed this

Thirteenth Day of December, 2005

JON W. DUDAS
*Director of the United States Patent and Trademark Office*